United States Patent
Sethi et al.

(10) Patent No.: US 12,393,709 B2
(45) Date of Patent: Aug. 19, 2025

(54) METHODS AND SYSTEMS FOR MODEL MANAGEMENT

(71) Applicant: Target Brands, Inc., Minneapolis, MN (US)

(72) Inventors: Mohit Sethi, Karnataka (IN); Prakash Mall, Karnataka (IN); Pralabh Kumar, Karnataka (IN)

(73) Assignee: Target Brands, Inc., Minneapolis, MN (US)

( * ) Notice: Subject to any disclaimer, the term of this patent is extended or adjusted under 35 U.S.C. 154(b) by 296 days.

(21) Appl. No.: 17/893,969

(22) Filed: Aug. 23, 2022

(65) Prior Publication Data

US 2024/0070304 A1 Feb. 29, 2024

(51) Int. Cl.
*G06F 21/62* (2013.01)
*G06F 9/54* (2006.01)
*G06F 16/182* (2019.01)

(52) U.S. Cl.
CPC .......... *G06F 21/6218* (2013.01); *G06F 9/543* (2013.01); *G06F 16/182* (2019.01)

(58) Field of Classification Search
CPC .............................. G06F 21/6218; G06F 9/543
See application file for complete search history.

(56) References Cited

U.S. PATENT DOCUMENTS

| | | | | |
|---|---|---|---|---|
| 10,713,594 | B2 * | 7/2020 | Szeto | G06N 20/00 |
| 10,911,468 | B2 * | 2/2021 | Muddu | G06F 3/04847 |
| 11,087,234 | B2 * | 8/2021 | Feng | H04L 41/16 |
| 2003/0088565 | A1 * | 5/2003 | Walter | G06F 18/231 |
| 2017/0178027 | A1 * | 6/2017 | Duggan | G06F 9/543 |
| 2020/0050968 | A1 * | 2/2020 | Lee | G06N 20/00 |
| 2020/0193044 | A1 * | 6/2020 | Dyvadheenam | H04L 67/568 |
| 2022/0038428 | A1 * | 2/2022 | Rodniansky | G06N 5/022 |
| 2022/0345543 | A1 * | 10/2022 | Oleinikov | G06F 16/313 |
| 2022/0414254 | A1 * | 12/2022 | Oliner | G06F 16/338 |
| 2023/0085848 | A1 * | 3/2023 | Saint Esteben | G06F 8/71 726/1 |
| 2024/0265138 | A1 * | 8/2024 | Yannuzzi | G06F 21/629 |

OTHER PUBLICATIONS

Vartak, et al., ModelDB: Proceedings of the Workshop on Human-in-the-Loop Data Analytics (Abstract—a system for machine learning model management); Dated Oct. 5, 2021; 2 pgs.
Vartak, et al., ModelDB: Opportunities and Challenges in Managing Machine Learning Models; Dated 2018; 8 pgs.
Lee, et al., From the Edge to the Cloud: Model Serving in ML.NET; IEEE, Dated 2018; 8 pgs.
Schelter, et al., On Challenges in Machine Learning Model Management; IEEE; Dated 2018; 11 pgs.

* cited by examiner

*Primary Examiner* — Dao Q Ho
(74) *Attorney, Agent, or Firm* — Merchant & Gould P.C.

(57) ABSTRACT

Methods, systems, and platforms for managing machine learning models are described. A model registry system receives first data including a model and second data including metadata and at least one metric of the model. Via a local network, the first data is stored to a data storage device and the second data is sent to an application programming interface (API). The first data is retrieved from the data storage device to a model use case program operating in a software development environment native to where the model registry system stores the model. The second data, including the metadata and the at least one metric of the model, is sent to a user interface (UI) via the API. The stored model can be deployed from the model use case program via the API.

19 Claims, 8 Drawing Sheets

METHODS AND SYSTEMS FOR MODEL MANAGEMENT

TECHNICAL FIELD

The present application relates generally to computer data science, and in particular to methods and systems for managing machine learning models.

BACKGROUND

Machine learning applications have become widely adopted in various domains including data science as applied in retail enterprises. Machine learning models are key components that enable these machine learning applications. The life cycle of a machine learning model starts with data processing, going through feature engineering, model experimentation, deployment, and maintenance. Model management systems are needed to store, track, manage, and benchmark machine learning models, to ensure effective and efficient applications.

Although the importance of model management systems is generally recognized, there are many challenges in designing and implementing such systems. A large-scale enterprise may utilize many different machine learning models, including very similar models at different points in time, or for similar use cases. Accordingly, machine learning models are often placed in different environments and frameworks across an enterprise through the phases of the machine learning life cycle. Multiple users will access the models being managed and each of them may have different development framework. Thus, it can be difficult to easily identify a particular machine learning model that may fit a need or use case, since many models may be deployed in a splintered fashion within an enterprise network.

In view of the above and other challenges, improvements are desirable.

SUMMARY

In general, this patent document relates to a software service usable to provide a repository with easy access to previously trained machine learning models. A development team that utilizes machine learning models can include multiple users working with various types of software development environments. Machine learning models are trained with input data by some of the users at one time, and are used for inferences by the same or other users at another time. Additionally, machine learning models that can be accessed by the development team can be in different phases of a model's life cycle. The models can have different metrics, too. More specifically, this document relates to methods and systems for sharing machine learning models as well as their metadata and metrics across different users in various development environments to increases reusability and cut down retraining time. Also, the disclosed methods and systems fit machine learning model management into the user's native workflow to improve productivity, and save network capacity resources by managing models in an offline mode.

In a first aspect, methods for managing machine learning models are disclosed. An example method includes receiving, by a model registry system, first data including a model and second data including metadata and at least one metric of the model, the model having been trained in a model training system connected to the model registry system via a local network. The example method also includes storing, by the model registry system and via the local network, the first data including the model in a data storage device, the data storage device operated by a first database management system; and sending, by the model registry system and via the local network, the second data including the metadata and the at least one metric of the model to an application programming interface (API). The example method further includes retrieving, by the model registry system and using the first database management system, the first data including the model from the data storage device to a model use case program, both the first database management system and the model use case program operating in a software development environment; and sending, via the API, the second data including the metadata and the at least one metric of the model to a user interface (UI).

In a second aspect, systems for managing machine learning models are disclosed. An example system includes an input device, a memory device, a processing device in communication with the memory device, and an output device. The processing device is configured to receive, from the input device, first data including a model and second data including metadata and at least one metric of the model, the model having been trained in a model training system connected to the system via a local network. The processing device is also configured to store, via the output device and the local network, the first data including the model in a data storage device, the data storage device operated by a first database management system; and send, via the output device and the local network, the second data including the metadata and the at least one metric of the model to an application programming interface (API). The processing device is further configured to retrieve, using the first database management system, the first data including the model from the data storage device; send the first data including the model to a model use case program, both the first database management system and the model use case program operating in a software development environment; and send, via the API, the second data including the metadata and the at least one metric of the model to a user interface (UI).

In a third aspect, platforms for managing machine learning models are disclosed. An example platform includes a first computing device and a second computing device, a plurality of data storage devices, a network server device, and a local network in communication with the plurality of data storage devices, the network server device, the first computing device, and the second computing device. The first computing device is configured to receive, via the local network, first data including a model and second data including metadata and at least one metric of the model, the model having been trained using the second computing device. The first computing device is also configured to store, via the local network, the first data including the model in the plurality of data storage devices, the plurality of data storage devices operated by at least one database management system; and send, via the local network, the second data including the metadata and the at least one metric of the model to an application programming interface (API) operating on the network server device. The first computing device is further configured to retrieve, using the at least one database management system, the first data including the model from the plurality of data storage devices; send the first data including the model to a model use case program operating on the second computing device, both the at least one database management system and the model use case program operating in a software development environment; and send, via the API, the second data including the metadata and the at least one metric of the model to a user interface (UI) operating on the second computing device.

Other objects and advantages of the invention will be apparent to one of ordinary skill in the art upon reviewing the detailed description of the invention.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

Corresponding reference characters indicate corresponding parts throughout the several views. The exemplifications set out herein illustrate embodiments of the invention, and such exemplifications are not to be construed as limiting the scope of the invention in any manner.

DETAILED DESCRIPTION

Figure 1:
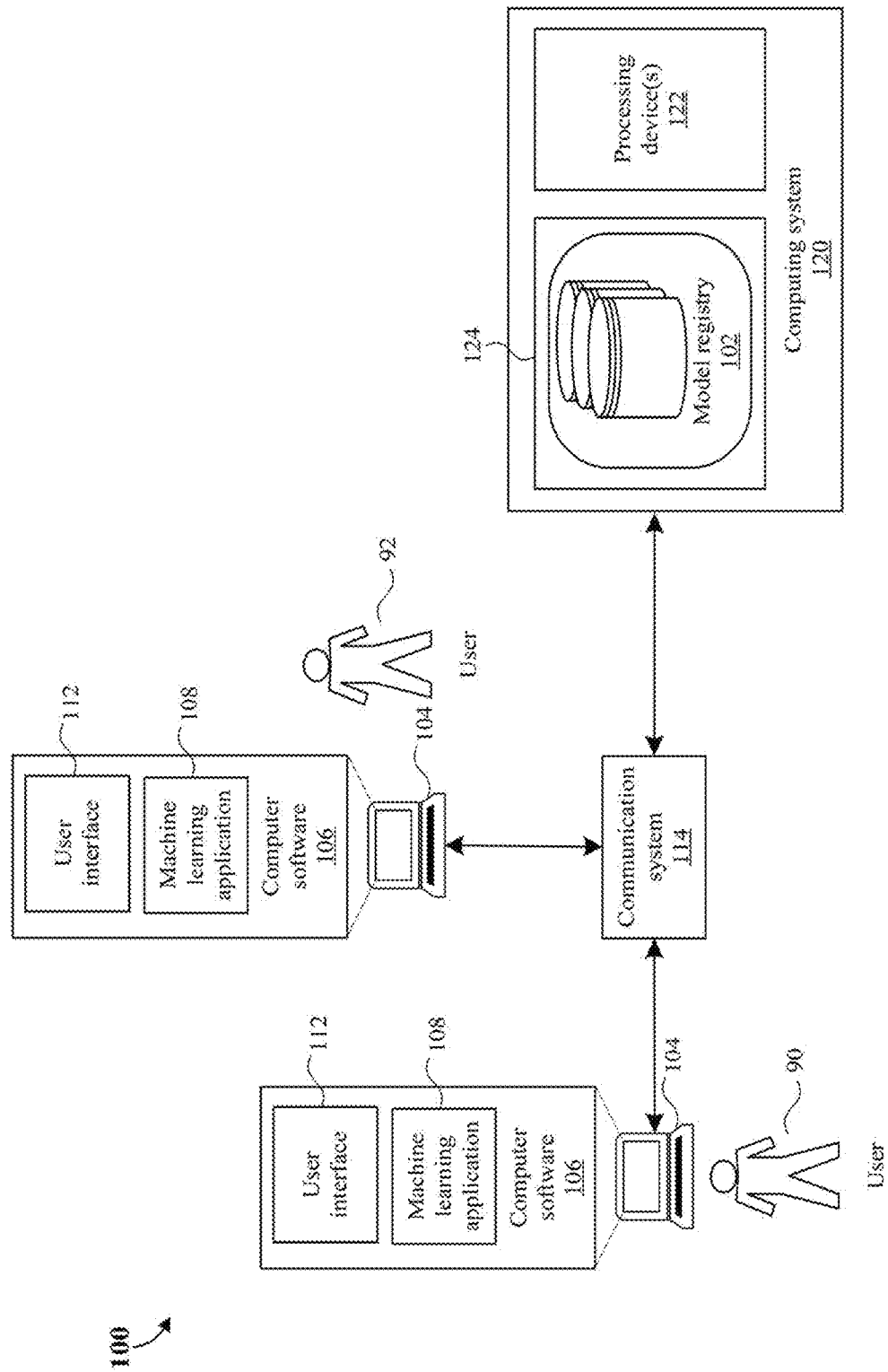
FIG. 1 is a schematic diagram illustrating an example system utilizing machine learning models.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

For purposes of this patent document, the terms "or" and "and" shall mean "and/or" unless stated otherwise or clearly intended otherwise by the context of their use. Whenever appropriate, terms used in the singular also will include the plural and vice versa. The use of "a" herein means "one or more" unless stated otherwise or where the use of "one or more" is clearly inappropriate. The use of "or" means "and/or" unless stated otherwise. The use of "comprise," "comprises," "comprising," "include," "includes," "including," "having," and "has" are interchangeable and not intended to be limiting. The term "such as" also is not intended to be limiting. For example, the term "including" shall mean "including, but not limited to."

All ranges provided herein include the upper and lower values of the range unless explicitly noted. Although values are disclosed herein when disclosing certain exemplary embodiments, other embodiments within the scope of the pending claims can have values other than the specific values disclosed herein or values that are outside the ranges disclosed herein.

Terms such as "substantially" or "about" when used with values or structural elements provide a tolerance that is ordinarily found during testing and production due to variations and inexact tolerances in factor such as material and equipment.

Generally speaking, the present disclosure relates to systems and methods for managing machine learning models by storing the source code, description, versioning, input data location, and other metadata or metrics of the managed models. In particular, the present disclosure relates to storing machine learning models in a repository with access shared by multiple users that can be using different software development environments or implementing different hardware structure to train machine learning models. Without a managed model repository providing a simple mechanism to share across teams of machine learning users, there could be problems. For example, when a user wants to use a previously trained model, the model must be trained again with the previous input data. Besides extra costs of retraining, the input dataset would likely have changed by that time. With the disclosed systems, a user can train machine learning models in an accustomed development environment while another user can apply these models for inferences at a later different time without having to retrain them. By providing seamless integration of the training and the application of machine learning models, the systems and methods described herein increase reusability of models and improve user productivity.

In example implementations, the model management systems described herein store machine learning models in a flexible structure of various types of data storage devices via a local network. For instance, the systems and methods described herein support container-based data storage device which is suitable for CPU-based training of machine learning models as well as distributed data storage device which is suitable for GPU-based training. As a result, more comprehensive integration of various development environments is achieved. Furthermore, it provides a more flexible set of use cases that can benefit technically from the model management systems described herein.

In another embodiment, the model management systems and methods described herein stores models in native development environments in which they will be applied for inferences. Thus, models are executable instantly upon retrieval, and users can weave this step into their production workflows without introducing any additional delays. As a result, the productivity of developers using the disclosed model management systems is further improved.

Still further, it can be non-advantageous to require interconnection of systems responsible for the training, the storage, and the application of machine learning models via the Internet because any integrated workflow would then necessarily incur function calls over Internet. These function calls over the Internet can be expensive in terms of consumption of network capacity resources. When a development system of hardware and software involving machine learning models scales up, the extra costs of consuming network capacity resources can quickly add up not only in terms of equipment costs but also in terms of the overall efficiency of the development system. Therefore, further embodiments of the subject matter described herein supports offline model management to reduce consumption of network resources by only using local networks.

Referring first to FIG. 1, an example machine learning system 100 in which aspects of the present disclosure may be implemented is shown. The machine learning system 100 includes at least one computing station 104, a computing system 120, and a communication system 114. The communication system 114 is configured to receive and send data communications in between the computing station 104 and the computing system 120. The computing station 104 is configured to send, via the communication system 114, data including or identifying trained machine learning models to the computing system 120 for storing the models. The computing system 120 is configured to store the machine learning models. The computing system 120 is also configured to send, via the communication system 114, data describing, or including, the stored machine learning models to the computing station 104 upon model retrieval by the computing station 104. Users (sometimes also referred to as machine learning engineers) 90 and 92 are also shown in FIG. 1.

In some embodiments, the system 100 includes multiple computing stations 104 operated by multiple users, respectively. The computing system 120 is configured to store machine learning models received from one of the computing stations 104 via the communication system 114. The computing system 120 is also configured to send the stored machine learning models to another one of the computing stations 104 via the communication system 114 upon model retrieval.

The computing station 104 includes a computer software 106, which is configured to operate on the computing station 104. The computer software 106 includes a machine learning application 108 and a user interface 112. Machine learning engineers or users must train machine learning models with input data before they can implement the models to draw inferences. For instance, the user 90 uses the machine learning application 108, which operates on the computing station 104, to develop computer software involving machine learning models. In various examples, the machine learning application 108 can include software programs configured to train machine learning models with input data, software programs configured to implement machine learning models for drawing inferences, or both types of software programs. The user interface 112 is another software program which is configured to display viewable contents to its users. The user interface 112 is also configured to take inputs from its users. For instance, the user 90 views data about machine learning models that has been visualized for display via the user interface 112. Also, the user 90 inputs commands that affect the use of machine learning models via the user interface 112.

The computing system 120 includes at least one processing device 122 and at least one memory device 124. In some embodiments, the at least one processing device 122 comprises one or more central processing units (CPU). In other embodiments, the at least one processing device 122 additionally or alternatively includes one or more digital signal processors, field-programmable gate arrays, or other electronic circuits.

The at least one memory device 124 operates to store data and instructions. In some embodiments, the at least one memory device 124 stores instructions for the at least one processing device 122 to execute on the computing system 120. The least one memory device 124 includes at least some form of computer-readable medium. Computer readable medium includes any available medium that can be accessed by the at least one processing device 122. By way of example, computer-readable medium includes computer readable storage medium and computer readable communication medium.

Computer readable storage medium includes volatile and nonvolatile, removable and non-removable medium implemented in any device configured to store information such as computer readable instructions, data structures, program modules, or other data. Computer readable storage medium includes, but is not limited to, random access memory, read only memory, electrically erasable programmable read only memory, flash memory and other memory technology, compact disc read only memory, blue ray discs, digital versatile discs or other optical storage, magnetic cassettes, magnetic tape, magnetic disk storage or other magnetic storage devices, or any other medium that can be used to store the desired information and that can be accessed by the at least one processing device 122. In some embodiments, computer readable storage medium is non-transitory computer readable storage medium.

Computer readable communication medium embodies computer readable instructions, data structures, program modules or other data in a modulated data signal such as a carrier wave or other transport mechanism and includes any information delivery medium. The term "modulated data signal" refers to a signal that has one or more of its characteristics set or changed in such a manner as to encode information in the signal. By way of example, computer readable communication medium includes wired medium such as a wired network or direct-wired connection, and wireless medium such as acoustic, radio frequency, infrared, and other wireless medium. Combinations of any of the above are also included within the scope of computer readable medium.

In the example illustrated by FIG. 1, the at least one memory device 124 stores computer readable instructions, data structures, program modules, or other data of a model registry 102. When the at least one processing device 122 of the computing system 120 executes computer readable instructions of the model registry 102, the computing system 120 operates as a model registry system (sometimes also referred to as a model management system, a model storage system, and the like). In an example implementation, the model registry 102 operating on the computing system 120 is configured to store the source code, description, versioning, input data location, and other metadata or annotated information of machine learning models in the at least one memory device 124. By using the model registry 102 to store the source code, description, versioning, input data location, and other metadata or annotated information of machine learning models, a managed model repository is created providing a simple mechanism to share across teams of machine learning engineers. The model registry 102 solves the problem that, for example, when a machine learning engineer wants to use a previously trained model, the model must be trained again with the previous input data. Besides saving the extra costs of retraining the machine learning model, the model registry 102 resolves the issue that input dataset used to train the model would likely have changed by the time of using the model. Because the machine learning engineer can identify and retrieve the desired model according to the stored metadata describing the model and the machine learning engineer does not have to retrain the model with input data.

In another example implementation, the model registry 102 operating on the computing system 120 is configured to store the source code, description, versioning, input data location, and other metadata or annotated information of machine learning models in other data storage devices that are connected to the computing system 120 via the communication system 114.

In yet another example implementation, the computing system 120 is a distributed computing environment comprising at least one network server, multiple computing devices, and multiple memory devices. The network server is configured to be in communication with other components of the distributed computing environment. The functionalities of the model registry 102 can be configured to be operated and executed on any combination of the multiple computing devices and memory devices. The functionalities of the model registry 102 can be configured to be operated and executed in a number of different sequential or parallel orders.

The communication system 114 is configured to transmit data of machine learning models managed by the model registry 102 between the computing station 104 and the computing system 120. The communication system 114 can be implemented as an Ethernet network, a token-ring network, a fiber optic network, a wireless network (e.g., Wi-Fi), or another type of network.

In some embodiments, the communication system 114 is a local network that is capable of offline functionalities without having to access the Internet. Examples of a local work includes local area network (LAN), wireless local area network (WLAN), etc. In other embodiments, the communication system 114 is a local connection interface configured to send and receive data communications in an offline mode without having to access any network. When systems on which a software program is operating are connected over the Internet, software function calls over Internet are expensive in terms of consumption of network capacity resources. When a development system of hardware and software involving machine learning models scales up, the extra costs of consuming network capacity resources can quickly add up not only in terms of equipment costs but also in terms of the overall efficiency of the development system. Therefore, the communication system 114 supporting offline model management reduces consumption of network resources by only using local networks or local connections.

Figure 2:
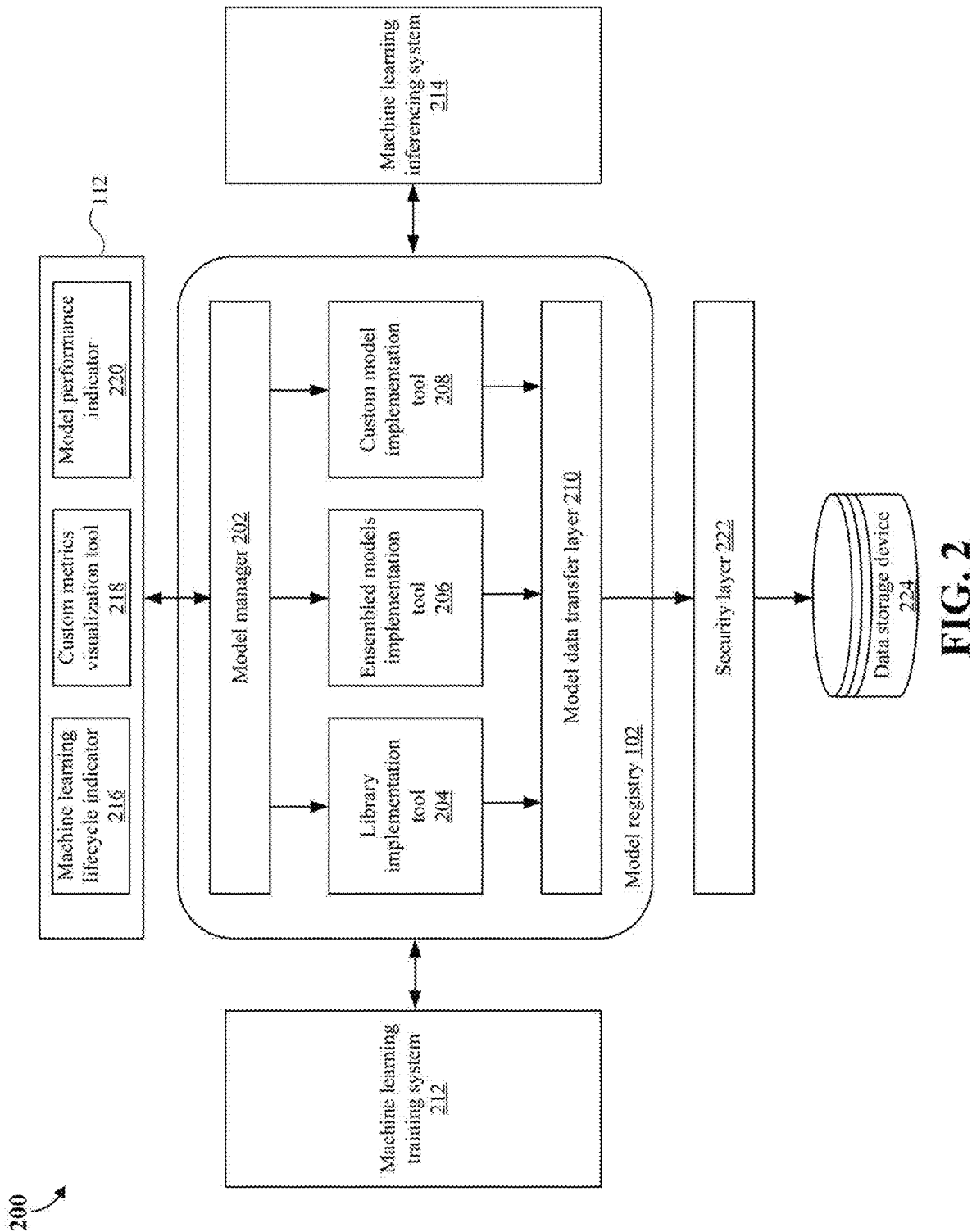
FIG. 2 is a schematic block diagram illustrating an example system for managing machine learning models.

FIG. 2 illustrates an example system 200 for managing machine learning models through their model lifecycles from training models to inferencing by using models. The example system 200 includes the model registry 102, the user interface 112 (illustrated and described in FIG. 1), a machine learning training system 212, a machine learning inferencing system 214, a security layer 222, and a data storage device 224.

The machine learning training system 212 is configured to prepare input data for training machine learning models by obtaining training data and test data that is used to develop a machine learning model. The machine learning training system 212 is also configured to conduct feature engineering by identifying or creating the appropriate descriptors from the input data (i.e., features) to be used by the machine learning model. The machine learning training system 212 is further configured to train machine learning models using the input data.

In some embodiments, the machine learning training system 212 is also configured to experiment with different machine learning models on the training and test data. For instance, since the key requirement when the machine learning training system 212 experiments with different machine learning models is to enable the users to choose the best model, metadata captured in this phase of experimentation includes items such as performance metrics for the model, hyperparameter values used during training, lifecycle indicators of the model, etc.

After training the machine learning model, the machine learning training system 212 is then configured to send data of the trained model and the captured metadata about the trained model to the model registry 102 operating on, for example, the computing system 120 (illustrated and described in FIG. 1). In some embodiments, users of the model registry 102 identify and retrieve the desired model base on the stored metadata capturing and describing the model. In other embodiments, users of the model registry 102 retrieve the data of the model itself.

In the example illustrated by FIG. 2, the model registry 102 includes a model manager 202, a library implementation tool 204, an ensembled models implementation tool 206, a custom model implementation tool 208, and a model data transfer layer 210. The model manager 202 is configured to control model management functionalities of the model registry 102. The model manager 202 is configured to call on the library implementation tool 204, the ensembled models implementation tool 206, or the custom model implementation tool 208, depending on the characters of the machine learning model being managed by the model registry 102.

In some embodiments, the machine learning model being managed by the model registry 102 is of a type of standard library model. A standard library model is a machine learning model that is in accordance with a standard definition of format. The model manager 202 is configured to process the storage, the management, and the retrieval of the standard library model using the library implementation tool 204.

In other embodiments, the machine learning model being managed by the model registry 102 is of a type of ensembled models. A set of ensembled models is a set of machine learning models that are combined according to certain rules. The model manager 202 is configured to process the storage, the management, and the retrieval of the ensembled models using the ensembled models implementation tool 206.

In further embodiments, the machine learning model being managed by the model registry 102 is of a type of custom model. A custom model is a machine learning model that is customized according to a specific design. The model manager 202 is configured to process the storage, the management, and the retrieval of the custom model using the custom model implementation tool 208.

The model data transfer layer 210 is configured to be the interface between the model registry 102 and systems external to the model registry 102 (e.g., the data storage device 224). The model manager 202 is configured to control the model data transfer layer 210 to transfer data of the machine learning model being managed by the model registry 102, thereby sending the data of the machine learning model to the data storage device 224, which stores the data of the machine learning model being managed by the model registry 102. In some embodiments, the data storage device 224 stores the data of the model using a database management system operating on the data storage device 224.

In some embodiments, the model registry 102 is configured to send data of the machine learning model through the security layer 222. The security layer 222 maintains a certain level of data security for the data transmission between the model registry 102 and the data storage device 224.

The model manager 202 is also configured to send metadata and metrics about the machine learning model being managed by the model registry 102 to the user interface 112. The user interface 112 includes a machine learning lifecycle indicator 216, a custom metrics visualization tool 218, and a model performance indicator 220.

The machine learning lifecycle indicator 216 is configured to display an indicator that indicates the current lifecycle phase of the machine learning model being managed by the model registry 102. For instance, the lifecycle of a machine learning model can be divided into five phases, namely: (1) data preparation, that is obtaining the training and test data to develop a model; (2) feature engineering, that is identifying or creating the appropriate descriptors from the input data (i.e., features) to be used by the model; (3) model training and experimentation, that is experimenting with different models on the training and test data and choosing the best; (4) deployment, that is deploying the chosen model in an inferencing system; and (5) maintenance, that is monitoring the model performance, updating the model as needed, and eventually retiring the model.

The custom metrics visualization tool 218 is configured to visualize at least one customarily designed metric about the machine learning model being managed by the model registry 102. For example, the user that stores or registers a machine learning model using the model registry 102 can also use the custom metrics visualization tool 218 to visualize information about feature importance of the model. In this case, the custom metrics visualization tool 218 is configured to display the visualized information about feature importance of the model to other users via the user interface 112.

The model performance indicator 220 is configured to display performance ratings of the machine learning model being managed by the model registry 102 to users who are reviewing the model via the user interface 112. Examples of the performance ratings including a minimum accuracy rating, a maximum accuracy rating, and the number of user teams that are using the model, etc.

Besides the machine learning lifecycle indicator 216, the custom metrics visualization tool 218, and the model performance indicator 220, the user interface 112 is also configured to display, to reviewing users, other metadata about the machine learning model being managed by the model registry 102. For example, the user interface 112 displays the name, the description, the creator's name, the code location, and the data location of the model. In other examples, the user interface 112 displays the number of models that are grouped under a common project.

The machine learning inferencing system 214 is configured to implement trained machine learning models in applications to draw inferences. The machine learning inferencing system 214 includes software programs configured to apply trained machine learning models. For example, the machine learning inferencing system 214 includes a model use case program configured to apply the model to an actionable use case. If a model is suitable for the user's implementation goal, the user can avoid retraining and easily start inferencing with one or two lines of code using the model use case program. Because the model use case program operates in the same native software development environment as the model registry 102.

In the example illustrated by FIG. 2, the machine learning inferencing system 214 communicates with the model registry 102 when the machine learning inferencing system 214 requests to use one of the models managed by the model registry 102. Upon receiving and approving the request, the model registry 102 is configured to retrieve data of the model from the data storage device 224 by controlling the data storage device 224. Upon retrieval of the data of the model, the model registry 102 is configured to send the data of the model to the machine learning inferencing system 214.

In some embodiments, the model registry 102, when retrieving the machine learning model, controls the data storage device 224 through a database management system operating on the data storage device 224.

In other embodiments, the model registry 102 is configured to control the data storage device 224 to directly send the machine learning model to the machine learning inferencing system 214.

Figure 3:
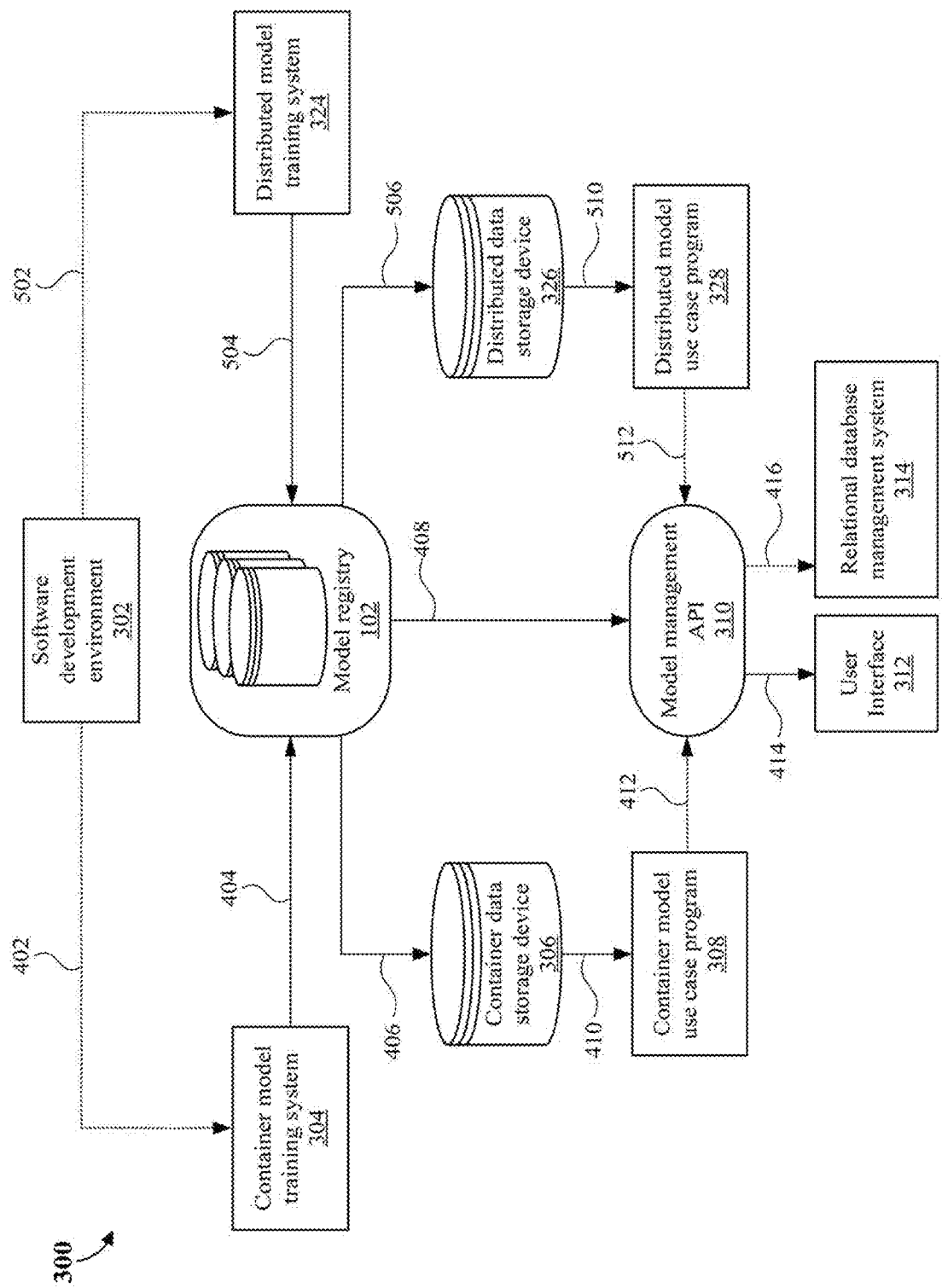
FIG. 3 is a system flow diagram illustrating an example system and processes for managing machine learning models.

FIG. 3 illustrates an example system 300 and example processes operating on the system 300 for managing machine learning models. In the example illustrated by FIG. 3, the system 300 includes the model registry 102, a container model training system 304, a container data storage device 306, a container model use case program 308, a model management application programming interface (API) 310, a user interface 312, a relational database management system 314, a distributed model training system 324, a distributed data storage device 326, and a distributed model use case program 328.

Example processes operating on the system 300 include steps 404, 406, 408, 410, 414, 504, 506, and 510. In some examples, steps 402, 412, 416, 502, and 512 are further included. These steps are described with details below and in FIGS. 4-5.

In some embodiments, the system 300 further includes a software development environment 302. The software development environment 302 is configured to develop a machine learning model and send the model to a model training system. In some examples, the software development environment 302 sends the model to the container model training system 304, which trains the model in step 402. In other examples, the software development environment 302 sends the model to the distributed model training system 324, which trains the model in step 502. In further examples, the software development environment 302 sends the model to both the container model training system 304 and the distributed model training system 324.

The container model training system 304 is based on a container technology, which enables software programs to operate in compatibility with a variety of different computing environments (e.g., WINDOWS or LINUX). The container technology is a form of operating system virtualization. A single container can be used to run anything from a small microservice or software process to a larger application. Inside a container are all the necessary executable files, binary code, libraries, and configuration files. Compared to server or machine virtualization approaches, however, containers do not contain operating system images. This makes them more lightweight and portable, with significantly less overhead. In larger application deployments, multiple containers can be deployed as one or more container clusters. For instance, the container technology utilized by the container model training system 304 is suitable for CPU-based training of machine learning models.

In some embodiments, the model registry 102 is configured to receive data including the machine learning model from the container model training system 304 in step 404. The model registry 102 is also configured to store the data including the machine learning model in the container data storage device 306 in step 406. The container data storage device 306 is also based on the container technology and is operated by a database management system that processes the movement of the model data.

The model registry 102 is further configured to send metadata and metrics of the model to the model management API 310 in step 408. The model management API 310 provides an addressable interface between the model registry 102 and the other systems or computer applications, acting as an intermediary layer exposed by the model registry 102 that processes data transfer between systems with improved convenience of collaboration and added layer of data security.

For model data retrieval, the model registry 102 is configured to control the container data storage device 306 through the database management system that processes the movement of the model data. By controlling the container data storage device 306, the model registry 102 is configured to retrieve model data from the container data storage device 306 to the container model use case program 308 in step 410. The container model use case program 308, based also on the container technology, operates on the machine learning inferencing system 214 (illustrated and described in FIG. 2) to apply the model to an actionable use case for inferencing. In some examples, the container model use case program 308 operates in the same native software development environment as the database management system that processes the movement of the model data in the container data storage device 306. Therefore, there is seamless integration between where the model data is stored and where the model is being applied. If a model is suitable for the user's implementation goal, the user can avoid retraining and easily start inferencing with one or two lines of code using the container model use case program 308. With simple computer software statements to apply the model, the user can easily fit both the retrieval and the inference of the machine learning models into a software development flow that the user is accustomed to (e.g., with scripting computer languages). Hence, the productivity of the user is significantly increased.

In some example implementations, the container model use case program 308 is also configured to deploy the retrieved machine learning model via the model management API 310 in step 412. Sitting in a system external to where machine learning models are stored, the model management API 310 is used as an interface to pass in data required for running a machine learning application. The user can access a data link that is linked to the model management API 310 and thereby get outputs of the machine learning application through the model management API 310. By deploying the model through the model management API 310, the user of the model does not need to manage all the background processes involving the model. Therefore, the usability of the machine learning model is significantly improved.

The model management API 310 is configured to send the metadata and metrics of the machine learning model, which the model management API 310 receives from the model registry 102, to the user interface 312 in step 414. The user interface 312 is then configured to display the metadata and metrics for the user to review.

In some example implementations, the model management API 310 is further configured to send the metadata and metrics of the machine learning model, which the model management API 310 receives from the model registry 102, to the relational database management system 314. By storing the metadata and metrics of the machine learning model with the relational database management system 314, more advanced operations on the metadata and metrics are enabled. For instance, the relational database management system 314 can be a POSTGRES database management system compatible with Structured Query Language (SQL). The relational database management system 314 is used for data analysis and creating reports related to the metadata and metrics of the machine learning model.

In other embodiments, the system 300 works with a distributed computing technology instead of the regular container technology in managing machine learning models. In this alternative scenario, the model registry 102 in the system 300 is configured to receive data including the machine learning model from the distributed model training system 324 in step 504, instead of receiving from the container model training system 304 in step 404. Also, the model registry 102 is configured to store the data including the machine learning model in the distributed data storage device 326 in step 506, rather than storing in the container data storage device 306 in step 406. Furthermore, the model registry 102 is configured to retrieve model data from the distributed data storage device 326 to the distributed model use case program 328 in step 510, instead of retrieving from the container data storage device 306 to the container model use case program 308 in step 410.

In examples of deploying the model through the model management API 310, the distributed model use case program 328 is configured to execute such deployment in step 512.

The distributed computing technology, by distributing the processing power to each of multiple nodes, clusters, or computing devices, significantly improves the processing speed of different computation tasks that need to be performed on large volumes of data. For instance, using the distributed computing technology on the distributed model training system 324, the distributed data storage device 326, and the distributed model use case program 328 is suitable for GPU-based training of machine learning models.

While using the distributed computing technology for increased scalability, the model management processes on the system 300 have similar features as embodied by the descriptions above of the steps 404, 406, 408, 410, 412, 414, and 416. For example, with simple computer software statements to apply the model in a native development environment, the user can easily fit both the retrieval and the inference of the machine learning models into a software development flow that the user is accustomed to (e.g., with scripting computer languages). Hence, the productivity of the user is significantly increased. Furthermore, by deploying the model through the model management API 310, the user of the model does not need to manage all the background processes involving the model. Therefore, the usability of the machine learning model is significantly improved.

In other embodiments, the system 300 is configured to execute model management processes based on both the container technology and the distributed computing technology for improved flexibility. For instance, the system 300 for model management is compatible with teams of machine learning engineers who adopt different computing environments. The system 300 is enabled to pick the best solution for machine learning models that are trained based on CPUs, and for those models that are trained based on GPUs.

Data transmissions in steps of the model management processes in FIG. 3 are carried out in various types of data connections. In example implementations, data is transmitted via local connections in steps 404, 406, 408, 410, 412, 504, 506, 510, and 512. Local connections to transmit the data can form a local network without connecting to the Internet or any other networks (e.g., public networks) external to the local network. By transmitting data over local connections or the local network, an offline mode of model management is enabled to reduce costs of network resources. The extra costs of consuming network resources can quickly add up not only in terms of equipment costs but also in terms of the overall efficiency of the development system utilizing machine learning models. Therefore, the offline mode of model management improves the efficiency of systems that manage and apply machine learning models.

Figure 4:
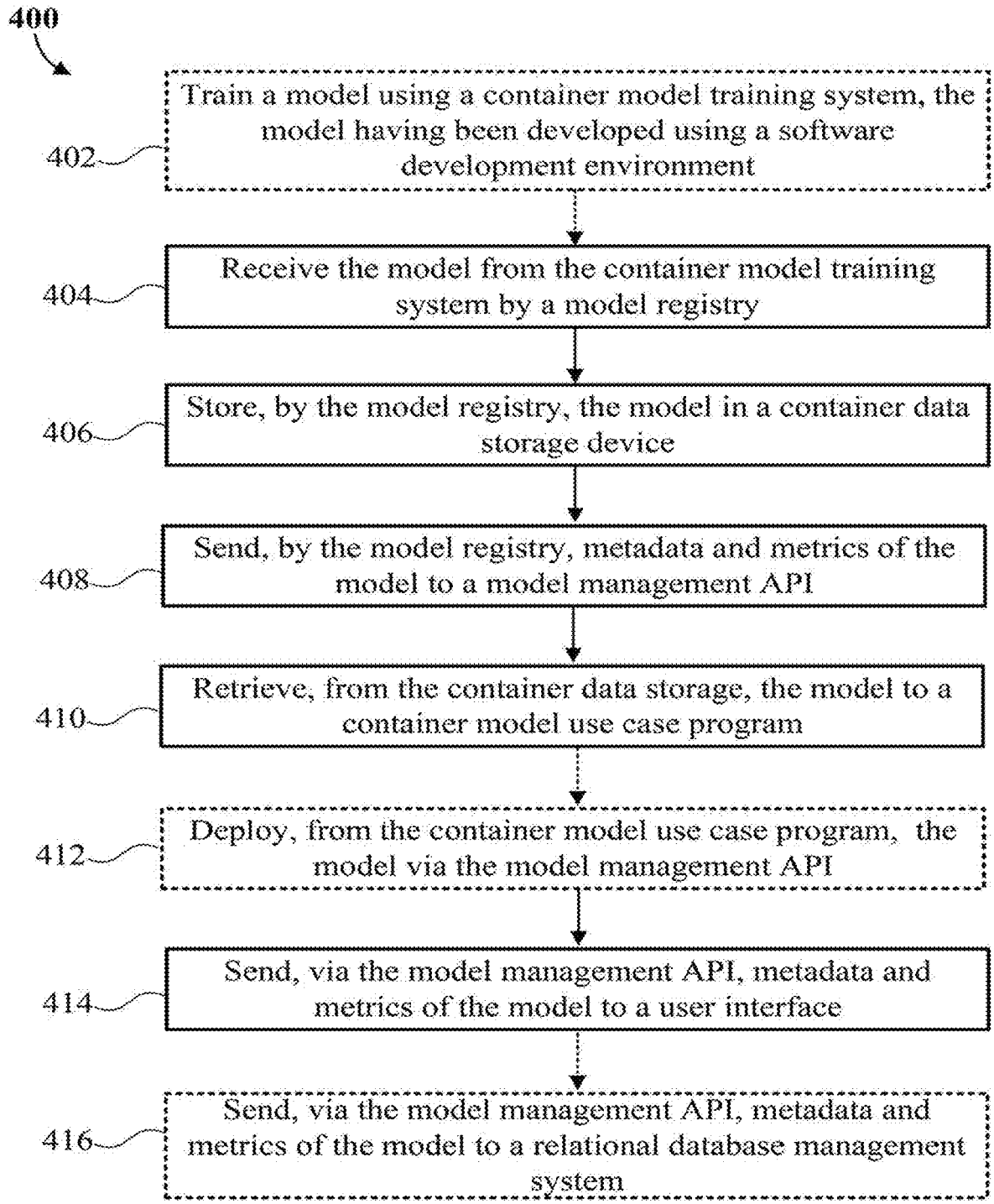
FIG. 4 is a flow chart illustrating an example method for managing machine learning models.

FIG. 4 illustrates an example method 400 for managing machine learning models based on a container-based technology. In some embodiments, the example method 400 is operated with the system 300 (illustrated and described in FIG. 3). In the illustrated example, the method 400 includes steps 402, 404, 406, 408, 410, 412, 414, and 416. In other examples, one or more of the steps 402, 412, and 416 can be omitted.

In the example shown, the method 400 includes training a model using a container model training system, the model having been developed using a software development environment (step 402). Machine learning models must be trained with input data before they can be implemented by users to draw inferences. Training a model in the container model training system is suitable for CPU-based training. The software development environment used to develop the model and the software development environment for inference can be the same development environment. In other implementations, the software development environment used to develop the model is different from the software development environment for inference.

The method 400 further includes receiving the model from the container model training system by a model registry (step 406). Received data includes the source code, description, versioning, input data location, and other metadata or annotated information of the machine learning model. With received data, the model registry (e.g., the model registry 102) provides a mechanism to share the access to machine learning models across teams of users and machine learning engineers. For instance, a first user created a machine learning model and modified the model without storing the initial version of the model. When a second user wants to use the initial model, the second user will have to retrain the model with input model without the model registry managing the model. Furthermore, the input data may have changed since the creation of the model, thereby makes retraining very difficult.

With the example method 400, the model registry is configured to solve the technical issues of the costs and difficulty involved with retraining. The example method 400 further includes storing the model in a container data storage device by the model registry (step 406), and sending metadata and metrics of the model to a model management API by the model registry (step 408). By storing the model in the container data storage device, the user who develops the model or another user can apply the model at a different time after the model is trained, without locating the initial input data and retraining the model with the input data. By reviewing the metadata and metrics of the model via the model management API, the user can compare and select machine learning models, based on the metadata and metrics, that are suitable for the user's implementation.

For retrieval of the model, the example method 400 includes retrieving, from the container data storage, the model to a container model use case program (step 410). In some examples, the container data storage is operated by a database management system that controls the data movement in and out from the container data storage. The user can apply the model in the same native software development environment as the database management system that processes the movement of the model data in the container data storage device. Using the same software development environment for the storage and the application of the model enables a complete and native workflow, which improves the productivity of the user.

The example method 400 further includes deploying, from the container model use case program, the model via the model management API (step 412). As described in FIG. 3, deploying through the model management API simplifies the process of applying the model from the perspective of the user who implements the model. Such deployment makes it technically easier to obtain outputs of the implementation of machine learning models.

The example method 400 further includes sending the metadata and metrics of the model to a user interface via the model management API (step 414), and sending the metadata and metrics of the model to a relational database management system via the model management API (step 416). The metadata and metrics can be viewed by users interactively via the user interface. However, interactive display is not optimal when there is a very large volume of metadata and metrics to be analyzed. Rather, processing large volumes of metadata and metrics with the relational database management system is a technically superior solution for more advanced data analytics.

Figure 5:
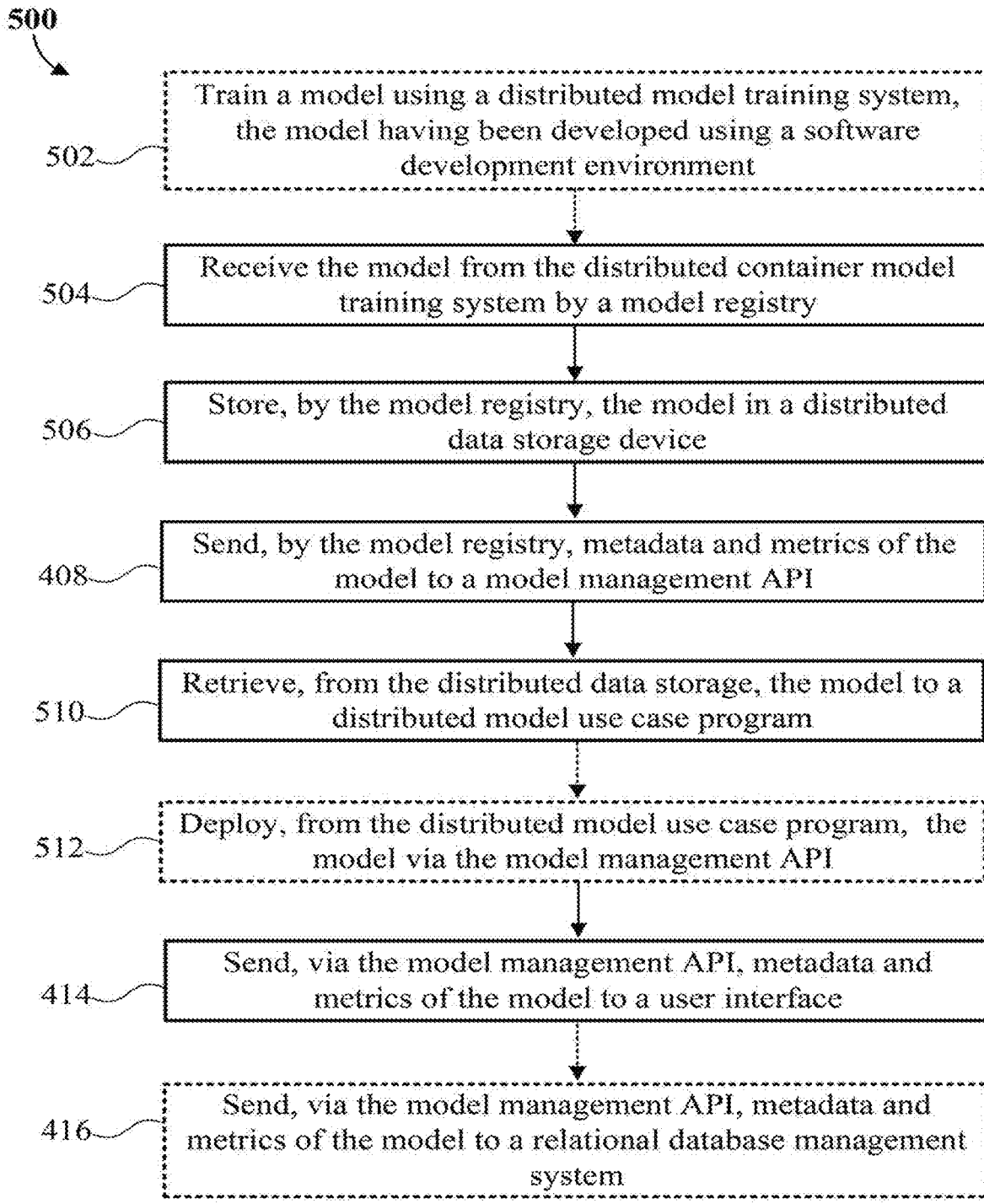
FIG. 5 is a flow chart illustrating another example method for managing machine learning models.

FIG. 5 illustrates another example method 500 for managing machine learning models based on a distributed computing technology. In some embodiments, the example method 500 is operated with the system 300 (illustrated and described in FIG. 3). In the illustrated example, the method 500 includes steps 408, 414, and 416 (illustrated and described in FIG. 4). The method 500 further includes steps 502, 504, 506, 510, and 512. In other examples, one or more of the steps 502, 512, and 416 can be omitted.

The method 500 shares the features as described for the method 400. However, the method 500 is based on the distributed computing technology instead of the regular container-based technology used by the method 400. Accordingly, the method 500 includes training a model using a distributed model training system, the model having been developed using a software development environment (step 502); receiving the model from the distributed container model training system by a model registry (step 504); storing, by the model registry, the model in a distributed data storage device (step 506); retrieving, from the distributed data storage, the model to a distributed model use case program (step 510); and deploying, from the distributed model use case program, the model via the model management API (step 512).

Using the distributed computing technology provides increased scalability and flexibility over different computing structures. For instance, the distributed model training system, the distributed data storage device, and the distributed model use case program are suitable for GPU-based training of machine learning models.

Figure 6:
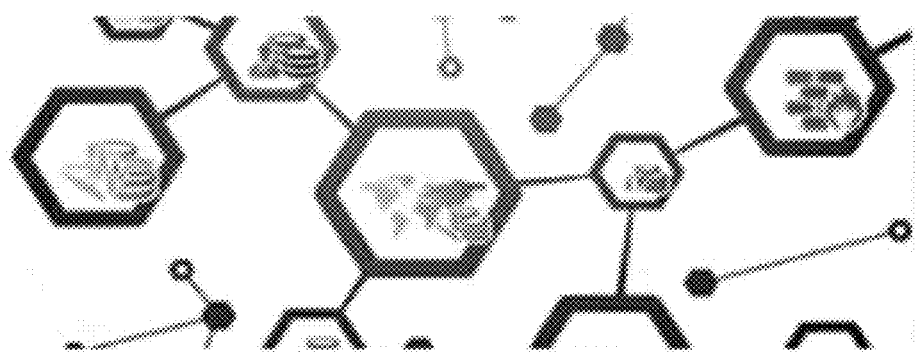
FIG. 6 is a layout diagram illustrating an example user interface for viewing metrics of machine learning models.

FIG. 6 illustrate an example user interface 600 to display metadata and metrics of machine learning models. The user interface 600 includes a project indicator 602 configured to indicate the name of the project that the current model is grouped under. The user interface 600 also includes a model number indicator 604 configured to indicate the number of models that are grouped under the same project. The user interface 600 further includes a maximum accuracy indicator 606 and a minimum accuracy indicator 608 configured to indicate a range of accuracy for the current model defined by a lower-end accuracy score and a higher-end accuracy score.

Figure 7:
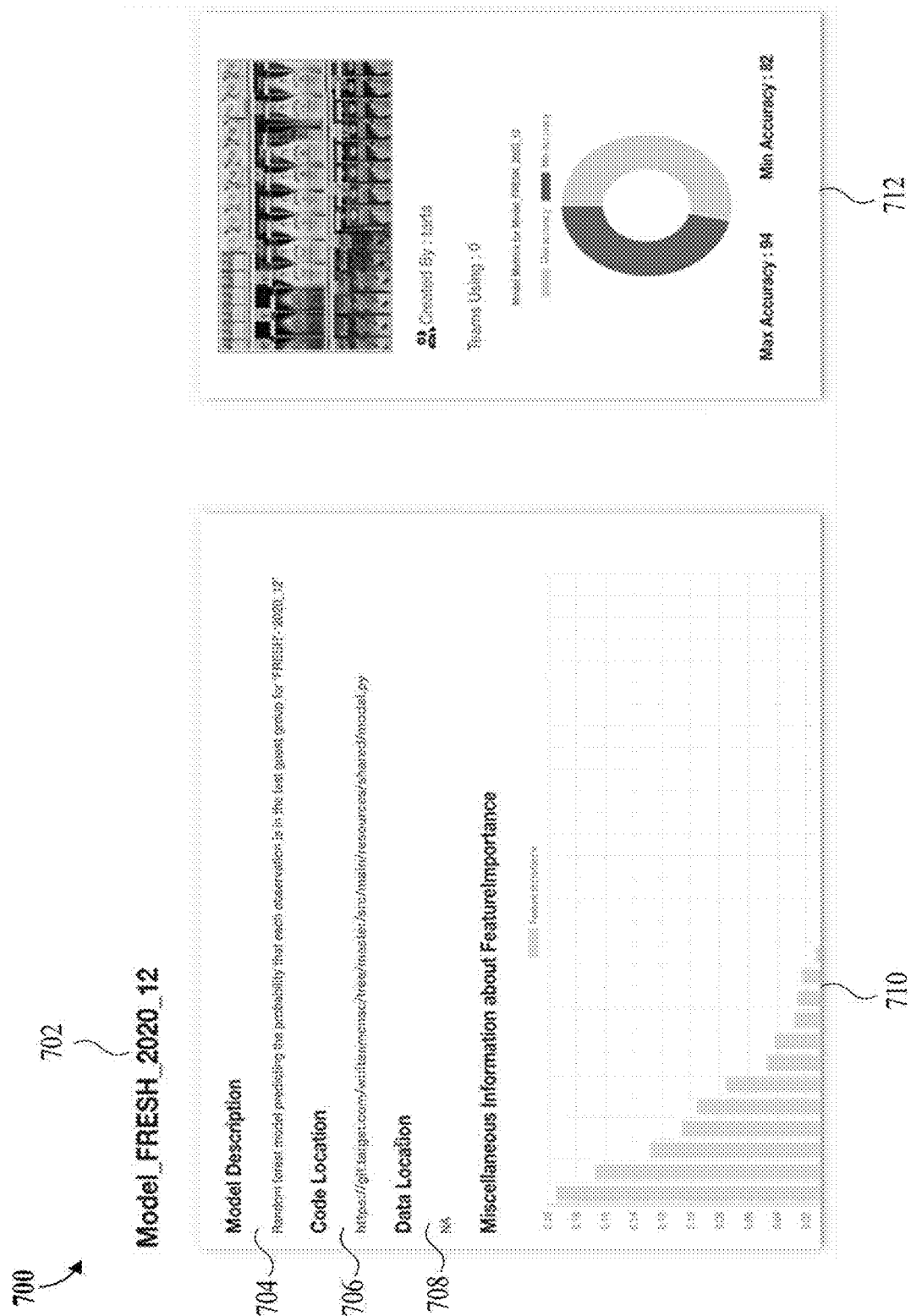
FIG. 7 is a layout diagram illustrating another example user interface for viewing metadata and metrics of machine learning models.

FIG. 7 illustrate another example user interface 700 to display metadata and metrics of machine learning models. The user interface 700 includes a model name field 702 indicating the name of the current model, a model description field 704 configured to describe the current model with textual information, a code location field 706 indicating where the source code of the current model is stored, and a data location field 708 indicating where the data used by the current model is stored. The user interface 700 also includes a custom metric chart 710. For instance, the custom metric chart 710 can display information about feature importance of the current model. The user interface 700 further includes a standard metric card 712 configured to display standard metrics of the current model. Examples of standard metrics include the creator of the model, the number of teams using the current model, and the model's accuracy score band, etc.

Figure 8:
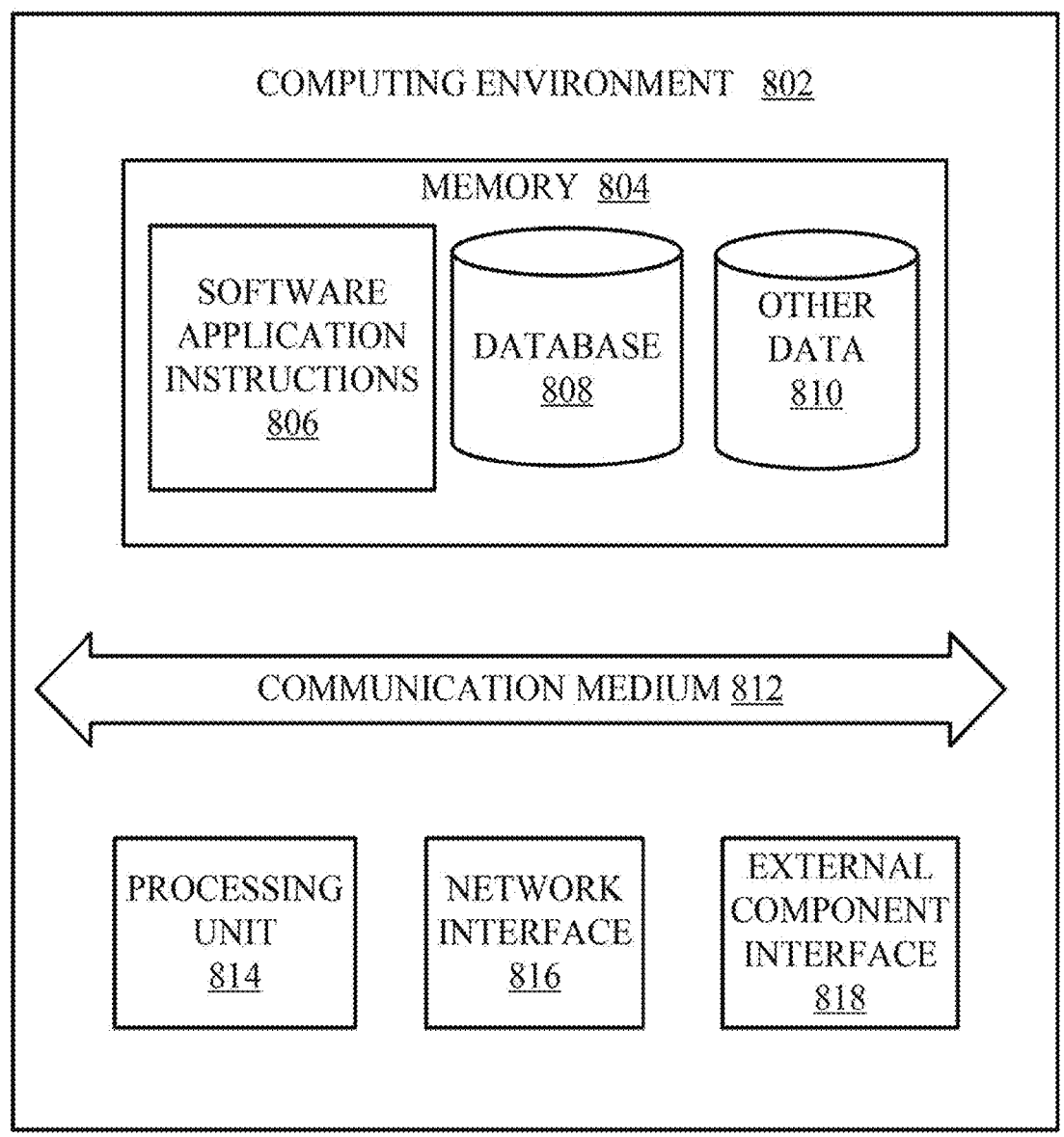
FIG. 8 illustrates an example computing system on which aspects of the present disclosure may be implemented.

FIG. 8 illustrates an example system 800 with which disclosed systems and methods can be used. In an example, one or more such systems 800 may be used to implement the computing station 104 and the computing system 120 described above in conjunction with FIG. 1, and the machine learning training system 212 and the machine learning inferencing system 214 described above in conjunction with FIG. 2.

In an example, the system 800 can include a computing environment 802. The computing environment 802 can be a physical computing environment, a virtualized computing environment, or a combination thereof. The computing environment 802 can include memory 804, a communication medium 812, one or more processing units 814, a network interface 816, and an external component interface 818.

The memory 804 can include a computer readable storage medium. The computer storage medium can be a device or article of manufacture that stores data and/or computer-executable instructions. The memory 804 can include volatile and nonvolatile, transitory and non-transitory, removable and non-removable devices or articles of manufacture implemented in any method or technology for storage of information, such as computer readable instructions, data structures, program modules, or other data. By way of example, and not limitation, computer storage medium may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data.

The memory 804 can store various types of data and software. For example, as illustrated, the memory 804 includes software application instructions 806, one or more databases 808, as well as other data 810.

The communication medium 812 can facilitate communication among the components of the computing environment 802. In an example, the communication medium 812 can facilitate communication among the memory 804, the one or more processing units 814, the network interface 816, and the external component interface 818. The communications medium 812 can be implemented in a variety of ways, including but not limited to a PCI bus, a PCI express bus accelerated graphics port (AGP) bus, a serial Advanced Technology Attachment (ATA) interconnect, a parallel ATA interconnect, a Fiber Channel interconnect, a USB bus, a Small Computing system interface (SCSI) interface, or another type of communications medium.

The one or more processing units 814 can include physical or virtual units that selectively execute software instructions, such as the software application instructions 806. In an example, the one or more processing units 814 can be physical products comprising one or more integrated circuits. The one or more processing units 814 can be implemented as one or more processing cores. In another example, one or more processing units 814 are implemented as one or more separate microprocessors. In yet another example embodiment, the one or more processing units 814 can include an application-specific integrated circuit (ASIC) that provides specific functionality. In yet another example, the one or more processing units 814 provide specific functionality by using an ASIC and by executing computer-executable instructions.

The network interface 816 enables the computing environment 802 to send and receive data from a communication network. The network interface 816 can be implemented as an Ethernet interface, a token-ring network interface, a fiber optic network interface, a wireless network interface (e.g., Wi-Fi), or another type of network interface.

The external component interface 818 enables the computing environment 802 to communicate with external devices. For example, the external component interface 818 can be a USB interface, Thunderbolt interface, a Lightning interface, a serial port interface, a parallel port interface, a PS/2 interface, or another type of interface that enables the computing environment 802 to communicate with external devices. In various embodiments, the external component interface 818 enables the computing environment 802 to communicate with various external components, such as external storage devices, input devices, speakers, modems, media player docks, other computing devices, scanners, digital cameras, and fingerprint readers.

Although illustrated as being components of a single computing environment 802, the components of the computing environment 802 can be spread across multiple computing environments 802. For example, one or more of instructions or data stored on the memory 804 may be stored partially or entirely in a separate computing environment 800 that is accessed over a network.

Depending on the size and scale of the computing environment 802, it may be advantageous to include one or more load balancers to balance traffic across multiple physical or virtual machine nodes. In an example, the node balancer may be a node balancer product provided by F5 NETWORKS, INC. of Seattle, Washington.

Aspects of the platform 800 and the computing environment 802 can be protected using a robust security model. In an example, users may be made to sign into the system using a directory service, such as ACTIVE DIRECTORY by MICROSOFT CORPORATION of Redmond, Washington. Connection and credential information can be externalized from jobs using an application programming interface. Credentials can be stored in an encrypted repository in a secured operational data store database space. Privileges can be assigned based on a collaboration team and mapped to a Lightweight Directory Access Protocol (LDAP) Group membership. A self-service security model can be used to allow owners to assign others permissions on their objects (e.g., actions).

Each node may be configured to be capable of running the full platform 800, such that portal can run and schedule jobs and serve the portal user interface as long as a single node remains functional. The environment 802 may include monitoring technology to determine when a node is not functioning so an appropriate action can be taken.

Referring to FIGS. 1-8 generally, and according to some examples, methods for managing machine learning models are disclosed. An example method includes receiving, by a model registry system, first data including a model and second data including metadata and at least one metric of the model, the model having been trained in a model training system connected to the model registry system via a local network. The example method also includes storing, by the model registry system and via the local network, the first data including the model in a data storage device, the data storage device operated by a first database management system; and sending, by the model registry system and via the local network, the second data including the metadata and the at least one metric of the model to an application programming interface (API). The example method further includes retrieving, by the model registry system and using the first database management system, the first data including the model from the data storage device to a model use case program, both the first database management system and the model use case program operating in a software development environment; and sending, via the API, the second data including the metadata and the at least one metric of the model to a user interface (UI).

Another example method further includes deploying, from the model use case program, the model via the API.

Yet another example method further includes sending, via the API, the second data including the metadata and the at least one metric of the model to a second database management system.

In some examples, the data storage device is a container data storage device and the model use case program is a container model use case program, the container data storage device and the container model use case program configured to operate in a plurality of computing environments.

In other examples, the data storage device is a distributed data storage device and the model use case program is a distributed model use case program, the distributed data storage device and the distributed model use case program configured to operate on a plurality of computing devices.

In further examples, storing the first data including the model in a data storage device comprises sending the first data via a security layer, the security layer configured to maintain a data security level of the first data.

In yet further examples, the method further includes managing, using a model manager of the model registry system, the model, the model manager having a library implementation tool configured to manage a standard model, a custom models implementation tool configured to manage a custom model, and an ensembled models implementation tool configured to manage a combination of a plurality of models.

In other examples, the metadata includes a first indicator indicating a lifecycle status of the model, and the at least one metric includes a second indicator indicating a performance level of the model.

According to some examples, systems for managing machine learning models are described. An example system includes an input device, a memory device, a processing device in communication with the memory device, and an output device. The processing device is configured to receive, from the input device, first data including a model and second data including metadata and at least one metric of the model, the model having been trained in a model training system connected to the system via a local network. The processing device is also configured to store, via the output device and the local network, the first data including the model in a data storage device, the data storage device operated by a first database management system; and send, via the output device and the local network, the second data including the metadata and the at least one metric of the model to an application programming interface (API). The processing device is further configured to retrieve, using the first database management system, the first data including the model from the data storage device; send the first data including the model to a model use case program, both the first database management system and the model use case program operating in a software development environment; and send, via the API, the second data including the metadata and the at least one metric of the model to a user interface (UI).

In other examples, the processing device is further configured to deploy, from the model use case program, the model via the API.

In further examples, the processing device is further configured to send, via the API, the second data including the metadata and the at least one metric of the model to a second database management system.

In yet further examples, the data storage device is a container data storage device and the model use case program is a container model use case program, the container data storage device and the container model use case program configured to operate in a plurality of computing environments.

In other examples, the data storage device is a distributed data storage device and the model use case program is a distributed model use case program, the distributed data storage device and the distributed model use case program configured to operate on a plurality of computing devices.

In further example systems, storing the first data including the model in a data storage device comprises sending the first data via a security layer, the security layer configured to maintain a data security level of the first data.

In other examples, the processing device is further configured to execute a plurality of model management instructions stored in the memory device, the plurality of model management instructions including a library implementation tool configured to manage a standard model, a custom models implementation tool configured to manage a custom model, and an ensembled models implementation tool configured to manage a combination of a plurality of models.

In further example systems, communicating via the local network does not require communication via a public network.

According to some examples, platforms for managing machine learning models are described. An example platform includes a first computing device and a second computing device, a plurality of data storage devices, a network server device, and a local network in communication with the plurality of data storage devices, the network server device, the first computing device, and the second computing device. The first computing device is configured to receive, via the local network, first data including a model and second data including metadata and at least one metric of the model, the model having been trained using the second computing device. The first computing device is also configured to store, via the local network, the first data including the model in the plurality of data storage devices, the plurality of data storage devices operated by at least one database management system; and send, via the local network, the second data including the metadata and the at least one metric of the model to an application programming interface (API) operating on the network server device. The first computing device is further configured to retrieve, using the at least one database management system, the first data including the model from the plurality of data storage devices; send the first data including the model to a model use case program operating on the second computing device, both the at least one database management system and the model use case program operating in a software development environment; and send, via the API, the second data including the metadata and the at least one metric of the model to a user interface (UI) operating on the second computing device.

In other examples, the platform further includes a third computing device connected to the local network, wherein the first computing device is further configured to deploy, from the model use case program operating on the second computing device, the model via the API and to the third computing device.

In further examples, the plurality of data storage devices include a container data storage device configured to operate in a plurality of computing environments, and a distributed data storage device configured to operate on a plurality of computing devices.

In yet further examples, the platform further includes a fourth computing device connected to the local network, wherein storing the first data including the model in the plurality of data storage devices comprises sending the first data via a security layer operating on the fourth computing device, the security layer configured to maintain a data security level of the first data.

The above specification, examples and data provide a complete description of the manufacture and use of the composition of the invention. Since many embodiments of the invention can be made without departing from the spirit and scope of the invention, the invention resides in the claims hereinafter appended.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A method comprising:
   receiving, by a model registry system, first data and second data, wherein the first data includes a model and the second data includes metadata and at least one custom metric of the model, the metadata including a first indicator indicating a lifecycle status of the model, and the at least one metric includes a second indicator indicating a performance level of the model, the model having been trained in a model training system connected to the model registry system via a local network, wherein the local network is a local connection interface configured to send and receive data communications in an offline mode;
   storing, by the model registry system and via the local network, the first data in a data storage device, the data storage device operated by a first database management system;
   sending, by the model registry system and via the local network, the second data to an application programming interface (API) configured to send the second data to a user interface (UI);
   retrieving, by the model registry system and using the first database management system, the first data from the data storage device to a model use case program, both the first database management system and the model use case program operating in a software development environment; and
   sending, via the API, the second data to the UI, wherein the UI is configured to display the at least one custom metric, wherein the at least one custom metric includes information about feature importance of the model.

2. The method of claim 1, further comprising deploying, from the model use case program, the model via the API.

3. The method of claim 1, further comprising sending, via the API, the second data to a second database management system.

4. The method of claim 1, wherein the data storage device is a container data storage device and the model use case program is a container model use case program, the container data storage device and the container model use case program configured to operate in a plurality of computing environments.

5. The method of claim 1, wherein the data storage device is a distributed data storage device and the model use case program is a distributed model use case program, the distributed data storage device and the distributed model use case program configured to operate on a plurality of computing devices.

6. The method of claim 1, wherein storing the first data in a data storage device comprises sending the first data via a security layer, the security layer configured to maintain a data security level of the first data.

7. The method of claim 1, further comprising managing, using a model manager of the model registry system, the model, the model manager having a library implementation tool configured to manage a standard model, a custom models implementation tool configured to manage a custom model, and an ensembled models implementation tool configured to manage a combination of a plurality of models.

8. A system comprising:
   an input device;
   a memory device;
   a processing device coupled to the memory device; and
   an output device,
   wherein the processing device is configured to:
   receive, from the input device, first data and second data, wherein the first data includes a model and the second data includes metadata and at least one custom metric of the model, the metadata including a first indicator indicating a lifecycle status of the model, and the at least one metric includes a second indicator indicating a performance level of the model, the model having been trained in a model training system connected to the system via a local network, wherein the local network is a local connection interface configured to send and receive data communications in an offline mode;

store, via the output device and the local network, the first data in a data storage device, the data storage device operated by a first database management system;
send, via the output device and the local network, the second data to an application programming interface (API) configured to send the second data to a user interface (UI);
retrieve, using the first database management system, the first data from the data storage device;
send the first data to a model use case program, both the first database management system and the model use case program operating in a software development environment; and
send, via the API, the second data to the UI, wherein the UI is configured to display the at least one custom metric, wherein the at least one custom metric includes information about feature importance of the model.

9. The system of claim 8, the processing device further configured to deploy, from the model use case program, the model via the API.

10. The system of claim 8, the processing device further configured to send, via the API, the second data to a second database management system.

11. The system of claim 8, wherein the data storage device is a container data storage device and the model use case program is a container model use case program, the container data storage device and the container model use case program configured to operate in a plurality of computing environments.

12. The system of claim 8, wherein the data storage device is a distributed data storage device and the model use case program is a distributed model use case program, the distributed data storage device and the distributed model use case program configured to operate on a plurality of computing devices.

13. The system of claim 8, wherein storing the first data in a data storage device comprises sending the first data via a security layer, the security layer configured to maintain a data security level of the first data.

14. The system of claim 8, the processing device further configured to execute a plurality of model management instructions stored in the memory device, the plurality of model management instructions including a library implementation tool configured to manage a standard model, a custom models implementation tool configured to manage a custom model, and an ensembled models implementation tool configured to manage a combination of a plurality of models.

15. The system of claim 8, wherein communicating via the local network does not require communication via a public network.

16. A platform for model management, comprising:
a first computing device and a second computing device;
a plurality of data storage devices;
a network server device; and
a local network in communication with the plurality of data storage devices, the network server device, the first computing device, and the second computing device, wherein the local network is a local connection interface configured to send and receive data communications in an offline mode;
wherein the first computing device is configured to:
receive, via the local network, first data and second data, wherein the first data includes a model and the second data includes metadata and at least one custom metric of the model, the metadata including a first indicator indicating a lifecycle status of the model, and the at least one metric includes a second indicator indicating a performance level of the model, the model having been trained using the second computing device;
store, via the local network, the first data in the plurality of data storage devices, the plurality of data storage devices operated by at least one database management system;
send, via the local network, the second data to an application programming interface (API) operating on the network server device, the API being configured to send the second data to a user interface (UI) operating on the second computing device;
retrieve, using the at least one database management system, the first data from the plurality of data storage devices;
send the first data to a model use case program operating on the second computing device, both the at least one database management system and the model use case program operating in a software development environment; and
send, via the API, the second data to the UI, wherein the UI is configured to display the at least one custom metric, wherein the at least one custom metric includes information about feature importance of the model.

17. The platform of claim 16, further comprising a third computing device connected to the local network, wherein the first computing device is further configured to deploy, from the model use case program operating on the second computing device, the model via the API and to the third computing device.

18. The platform of claim 16, wherein the plurality of data storage devices include a container data storage device configured to operate in a plurality of computing environments, and a distributed data storage device configured to operate on a plurality of computing devices.

19. The platform of claim 16, further comprising a fourth computing device connected to the local network, wherein storing the first data in the plurality of data storage devices comprises sending the first data via a security layer operating on the fourth computing device, the security layer configured to maintain a data security level of the first data.

* * * * *